United States Patent
Rodriguez et al.

(10) Patent No.: US 6,343,919 B1
(45) Date of Patent: Feb. 5, 2002

(54) MODULAR PLASTICS EXTRUSION DIE

(76) Inventors: Ricardo Pablo Rodriguez, 1919 Royal Credit Boulvard, Mississauga, Ontario (CA), L5M 4Y1; Michael Peter Bucko, 5824 Cornell Crescent, Mississauga, Ontario (CA), L5M 5R5

( * ) Notice: Subject to any disclaimer, the term of this patent is extended or adjusted under 35 U.S.C. 154(b) by 0 days.

(21) Appl. No.: 09/514,359

(22) Filed: Feb. 28, 2000

(51) Int. Cl.[7] .......................... B29C 47/06; B29C 47/20
(52) U.S. Cl. .................... 425/133.1; 425/192 R; 425/380; 425/462
(58) Field of Search ................... 425/133.1, 192 R, 425/378.1, 380, 462

(56) References Cited

U.S. PATENT DOCUMENTS

| | | | |
|---|---|---|---|
| 3,809,515 A | * 5/1974 | Farrell | 425/133.1 |
| 4,182,603 A | 1/1980 | Knittel | 425/133.1 |
| 4,403,934 A | * 9/1983 | Rasmussen et al. | 425/133.1 |
| 4,657,497 A | 4/1987 | Dehennau et al. | 425/133.1 |
| 4,723,902 A | 2/1988 | Erickson | 425/380 |
| 4,798,526 A | 1/1989 | Briggs et al. | 425/113 |
| 4,889,477 A | 12/1989 | Wortberg et al. | 425/133.1 |
| 4,895,744 A | 1/1990 | Briggs et al. | 428/35.7 |
| 5,019,433 A | 5/1991 | Briggs et al. | 428/35.7 |
| 5,069,612 A | 12/1991 | Teutsch et al. | 425/133.1 |
| 5,076,776 A | * 12/1991 | Yamada et al. | 425/133.1 |
| 5,393,216 A | 2/1995 | Teutsch et al. | 425/133.1 |
| 5,538,411 A | 7/1996 | Gates | 425/133.1 |
| 5,690,972 A | 11/1997 | Planeta et al. | 425/133.1 |
| 5,716,650 A | 2/1998 | Mavridis | 425/131.1 |
| 5,738,881 A | 4/1998 | Sagar | 425/133.1 |
| 5,779,959 A | 7/1998 | Teutsch et al. | 264/171 |
| 6,190,152 B1 * | 2/2001 | Cree | 425/133.1 |

FOREIGN PATENT DOCUMENTS

| | | |
|---|---|---|
| DE | 4218095 | * 12/1993 |
| EP | 0 252 388 | 1/1988 |
| EP | 0419983 | * 4/1991 |
| EP | 0 568 544 | 11/1993 |
| EP | 0 626 246 | 11/1994 |

* cited by examiner

*Primary Examiner*—Nam Nguyen
*Assistant Examiner*—Joseph Leyson
(74) *Attorney, Agent, or Firm*—Gowling Lafleur Henderson LLP (57) ABSTRACT

A melt distribution block for feeding melt through an extrusion die to an extrusion passage. The melt distribution block has a generally annular body with inner, outer, front and rear faces. The front and rear faces include a series of flow divider channels therein extending generally radially inwardly from an inlet and terminating in a plurality of feed spirals. The feed spirals curve radially inwardly from the flow divider channels to encircle the inner face and narrow toward a radially inwardly disposed end. The feed spirals on the front and rear spaces curve in respectively opposite directions. An inlet port extends into the outer face and fluidly communicates with the inlet of the flow divider channels. A melt distribution die includes an axially stacked array of melt distribution blocks interspersed with separator blocks extending radially about a centrally disposed mandrel to define an extrusion and passage therebetween.

16 Claims, 7 Drawing Sheets

MODULAR PLASTICS EXTRUSION DIE

FIELD OF THE INVENTION

This invention relates to co-extrusion dies for extruding multilayer polymer materials into a single tubular form.

BACKGROUND OF THE INVENTION

Many areas of polymer processing require multiple layers of different polymers to be co-extruded into a single tubular form. One example is the blown film process which is used to make most of today's commodity bags and also high barrier food packaging. Although multi-layer packaging can be made from co-extruded flat film, using a tubular form presents fewer sealing operations, results in less trim scrap and is more conducive to certain product shapes.

Tubular forms are used in many applications including the production of multi-layer pipe or tubing, pipe coating, wire coating, and the production of multi-layer parisons for blow molding. Tubular parisons are used in making containers of various shapes as annular dies are typically easier to manufacture than dies of other shapes, such as oval or square. Annular co-extrusion dies are commonly used to process high volume commodity resins as well as relatively low volumes of barrier type resins.

Annular co-extrusion dies are generally of one of two arrangements; namely axially fed and radially fed. In either type of arrangement, melt is introduced into an inlet port from where it has to be evenly distributed about the circumference of an annular outlet. Good flow distribution is essential to forming film having layers which are uniform in thickness, appearance and structural integrity. In axially fed co-extrusion dies, melt is fed in a direction parallel to the axis of the tubular form to be extruded. Each layer is formed between respective die elements which are generally concentrically disposed in a manner analogous to cups of different diameter stacked one within an other. The individual layers are merged upstream in an extrusion passage through which the co-extruded film is discharged.

In radially fed co-extrusion dies, melt distribution blocks are stacked one behind another along a die axis and melt is fed radially relative to the die axis into a respective inlet port in each melt distribution block. The melt distribution blocks distribute the melt about a central mandrel and discharge the melt in an axial direction into an extrusion passage between the melt distribution blocks and the mandrel. Each consecutive melt distribution block applies an overlying melt layer to the melt moving along the extrusion passage.

Axially stacked radially fed co-extrusion dies are advantageous in that it is relatively simple to vary the number of layers by varying the number of "modules" stacked along the die. Furthermore, each level presents a similar area and the levels are more easily thermally isolated than possible with axially fed co-extrusion dies in which heat from one die element is difficult to isolate from adjacent die elements. Even melt distribution is however a much more challenging problem with radially fed co-extrusion dies because of a much shorter axial distance being available for melt equalization and the requirement to redirect melt flow from a radial to an axial direction after the melt has been distributed into a thin film.

It is an object of the present invention to provide a radially fed multilayer extrusion die which is effective in providing a uniformly thick film of melt to an extrusion passage.

It is a further object of the present invention to provide a melt distribution block for a radially fed multilayer extrusion die which can accept and combine two different types of melt.

It is yet a further object of the present invention to provide a melt distribution block for an extrusion die having a matched pair of distribution passages so configured and oriented as to cause an averaging of extruded film thickness by matching high flow areas of one of said pair of passages with lower flow areas of the other of said pair of passages.

SUMMARY OF THE INVENTION

A melt distribution block for feeding melt through an extrusion die to an extrusion passage. The melt distribution block has a generally annular body with an inner face extending about the extrusion passage, an outer face radially outward of the inner face and opposite front and rear faces. The front and rear faces each have a series of flow divider channels thereon which extend in a generally radially inward direction from an inlet through a series of flow diverting bifurcations which terminate in a plurality of feed spirals. Each of the feed spirals substantially encircles the inner face and narrows toward a radially inwardly disposed end. The feed spirals on the front and rear faces curve in respectively opposite directions. An inlet port extends into the outer face to fluidly communicate with the inlet of the flow divider channels.

A melt distribution die has an axially stacked array of melt distribution blocks of the type described above interspersed with separator blocks extending radially about a centrally disposed mandrel. An extrusion passage is defined between the mandrel and the stacked array of melt distribution and separator blocks. The separator blocks cover the flow divider channels to maintain melt flow within the flow divider channels. The separator blocks are spaced apart from the feed spirals to define a generally continuous melt outlet passage extending into the extrusion passage.

In order to thermally isolate adjacent feed spirals, the separator blocks may be provided with a radially extending insulating zone generally corresponding in location to the feed spirals.

DESCRIPTION OF DRAWINGS

Preferred embodiments of the invention are described below with reference to the accompanying drawings in which.

DESCRIPTION OF PREFERRED EMBODIMENTS

A melt distribution block according to the present invention is generally indicated by reference 10 in the accompanying illustrations. The melt distribution block has a generally annular body 12 with an inner face 14 which, in use, extends about and defines part of an outer surface an extrusion passage 16 in FIGS. 6 and 7. The melt distribution block 10 has an outer face 18 radially outward of the inner face 14, a front face 20 in FIG. 1 and a rear face 22 in FIG. 2, opposite the front face 20.

Figure 1:
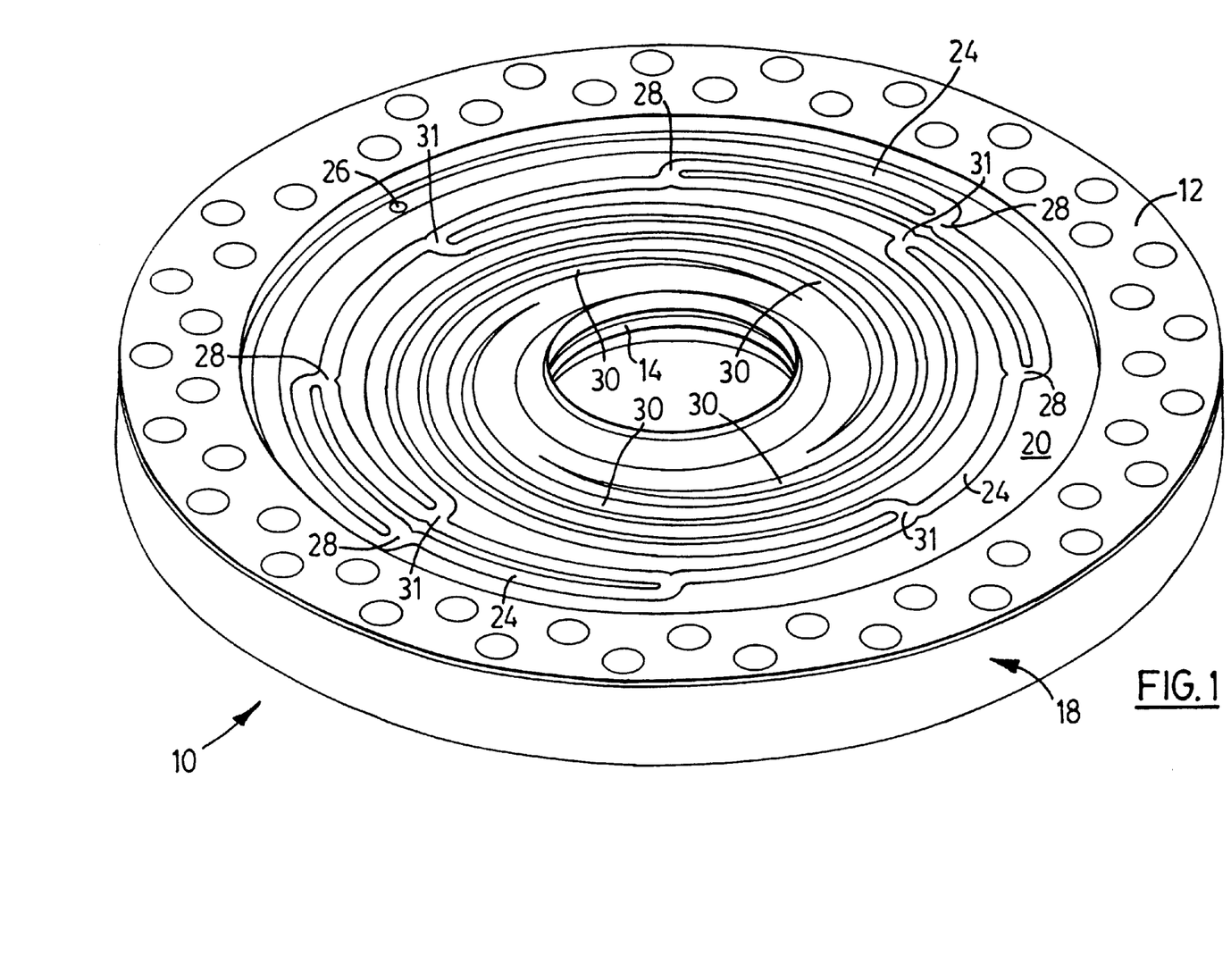
FIG. 1 is a perspective view of a melt distribution block according to the present invention.
Figure 2:
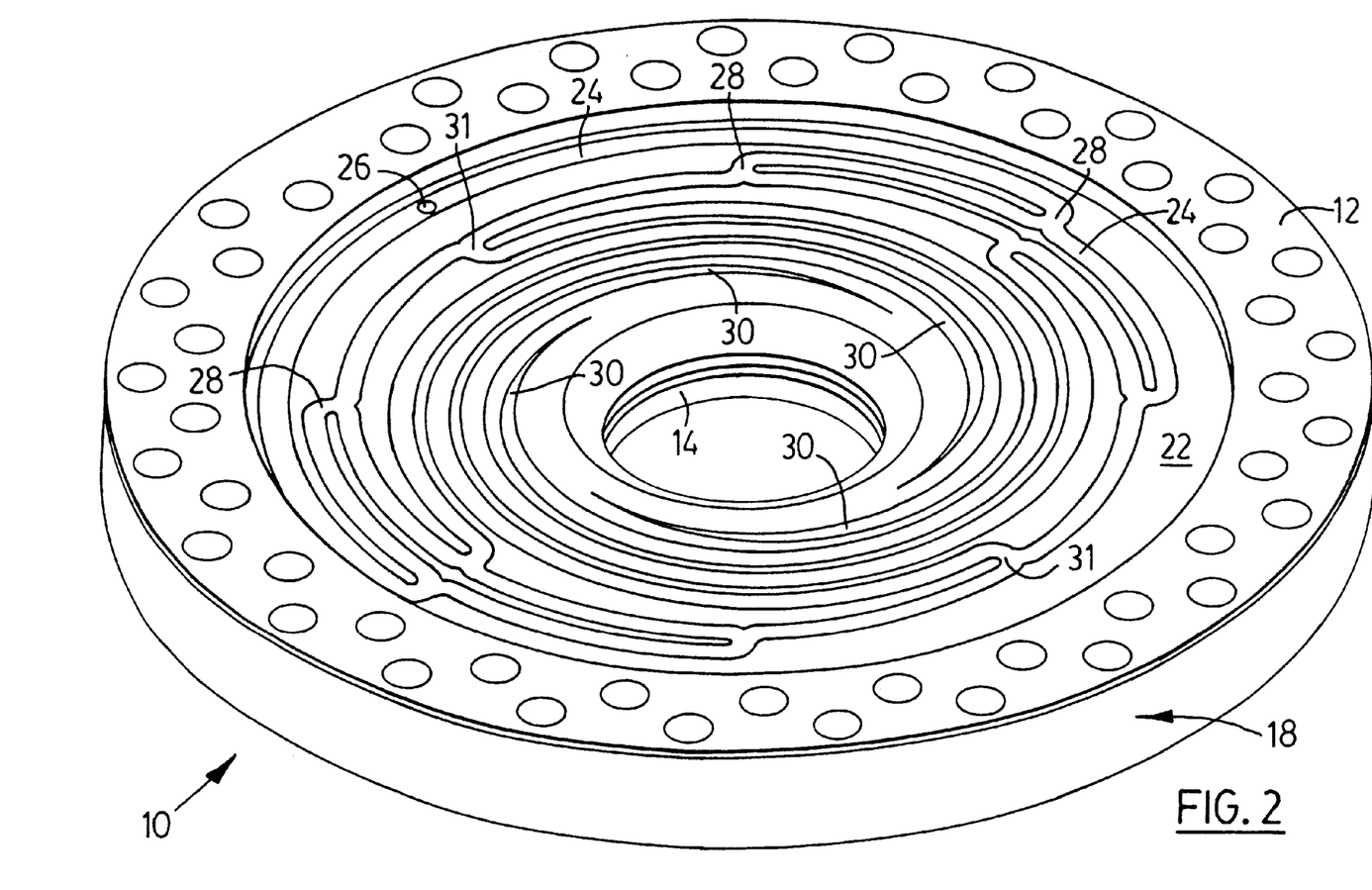
FIG. 2 is a perspective view corresponding to FIG. 1 but showing an opposite face of a melt distribution block according to the present invention.

The front and rear faces, 20 and 22 respectively have a series of flow divider channels 24 extending into their surfaces. The flow divider channels 24 are generally concentrically disposed and define a flow path which extends in a generally radially inward direction from an inlet 26 through a series of flow dividing bifurcations 28.

Each of the flow dividing bifurcations 28 is located at a juncture of the end of a flow dividing channel 24 and the midpoint of an adjacent, radially inwardly disposed flow dividing channel 24. The direction of melt flow is initially from an inlet 26 into the outermost flow divider channel 24 and then through the flow dividing bifurcations 28 into adjacent radially inwardly disposed flow dividing channels 28. Upon passing through each flow dividing bifurcation 28, which are in effect "T" junctions, melt flow is divided into two generally oppositely directed melt flow paths of similar configuration and therefore similar flow rate.

The flow dividing channels 24 distribute melt from the inlet 26 evenly about the mold block 10 which is important as a first step in ensuring uniformity of flow from the mold block 10 into the extrusion passage 16 about its circumference.

The flow dividing channels 28 terminate in four feed spirals 30 which are radially inward of the flow dividing channels 28. Although four feed spirals 30 are illustrated, other numbers may be selected as being more desirable in some applications, keeping in mind however that the number of flow dividing channels 28 would have to be selected accordingly.

Each feed spiral 30 is "fed" by (ie., fluidly communicates with) two of the flow divider channels 24 at references 31 to obtain as consistent as possible a flow of melt into each of the feed spirals 30 by "averaging" the melt flow between adjacent flow divider channels 28.

Each feed spiral 30 substantially encircles the inner face 14 in a loop of diminishing radius and breadth. The feed spirals 30 are basically channels of diminishing width and breadth, the purpose of which is to evenly spread melt over a thin, even layer before it enters the extrusion passage 16. Using a plurality of circumferentially spaced apart feed spirals 30 evens out the flow from each feed spiral. To further even out high and low flow areas, the front and rear faces 20 and 22 have respective feed spirals 30 which curve in opposite directions relative to each other as viewed through the melt distribution block 10.

It should be noted that although the feed spirals 30 in FIGS. 1 and 2 appear to curve in a clockwise direction, FIGS. 1 and 2 depict faces of a melt distribution block 10 which would face away from each other. Accordingly, if either of FIGS. 1 and 2 is flipped over and viewed against a light, it will become apparent that the curve of the feed spirals 30 when viewed "through" the melt distribution block 10 is reversed from that when viewed on its face. A similar reversal should be notionally taken into account in considering the plan views of FIGS. 3 and 4.

Figure 3:
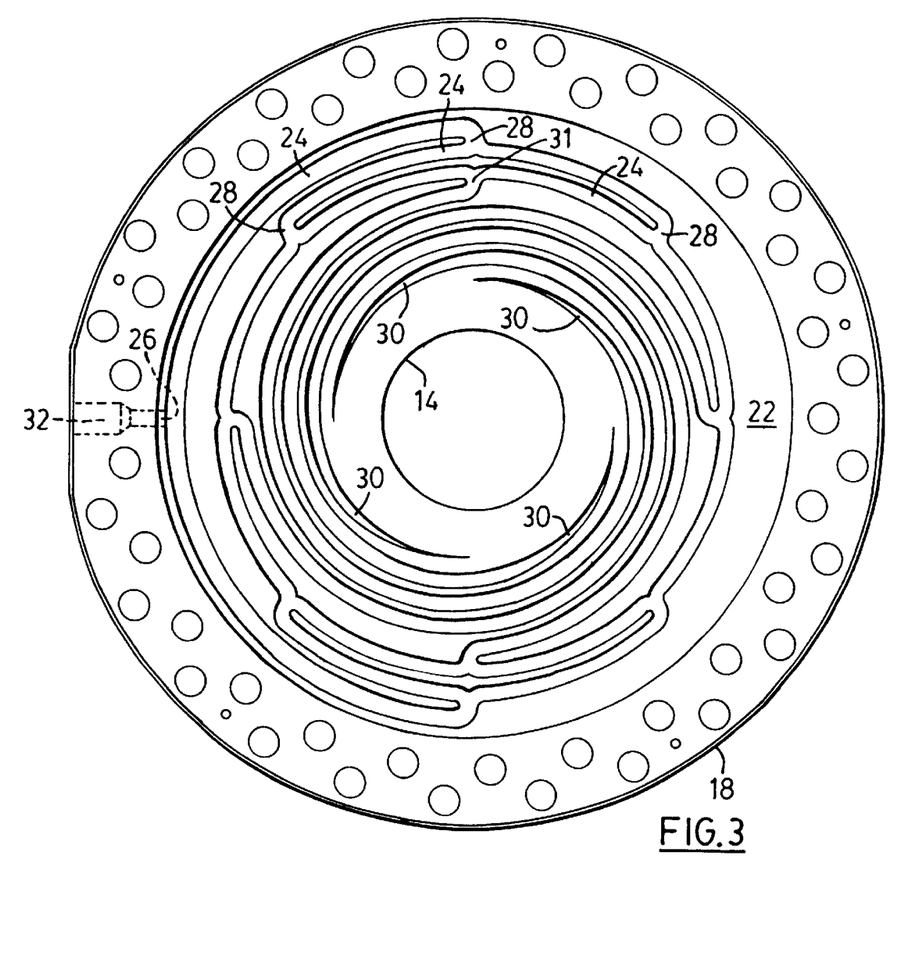
FIG. 3 is a top plan view of a melt distribution block according to the present invention.
Figure 4:
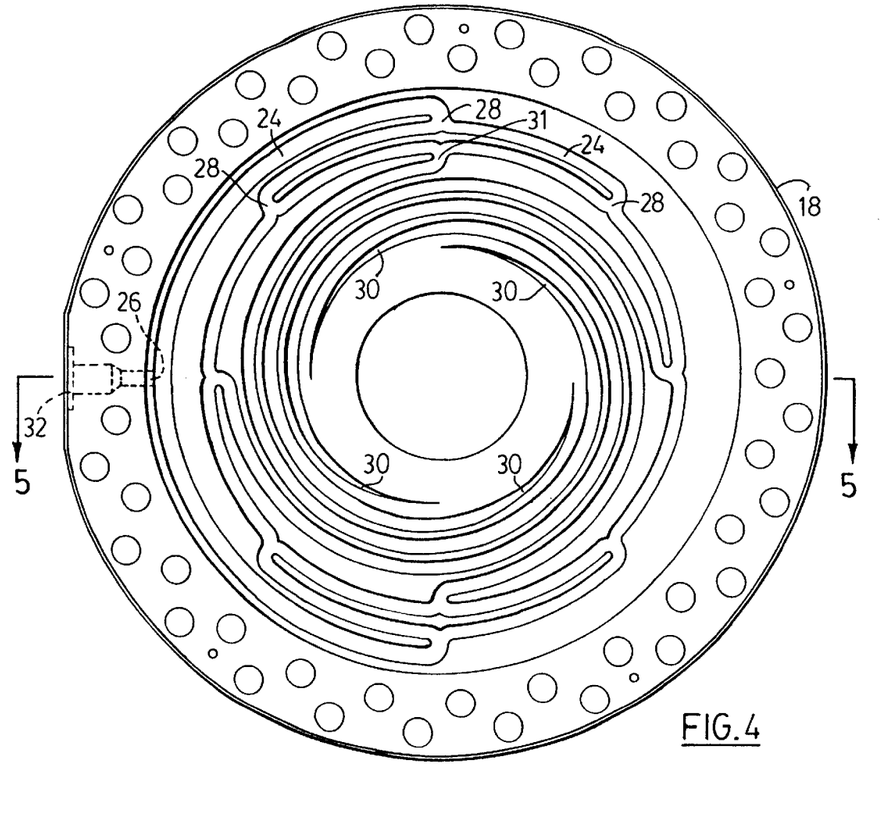
FIG. 4 is a bottom plan view of a melt distribution block according to the present invention.
Figure 5:
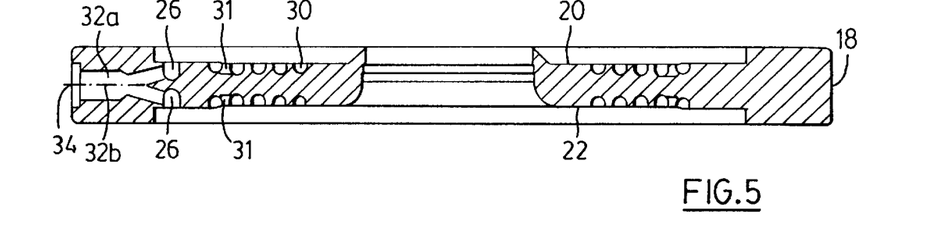
FIG. 5 is a section on line 5—5 of FIG. 4.

As can be seen in FIGS. 3, 4 and 5, an inlet port 32 extends into the outer face 18 of the melt distribution block 10 and fluidly communicates within the inlets 26 of the flow divider channels 24. As illustrated, the inlet port 32 feeds the inlets 26 on the front face 20 and rear face 22 of the melt distribution block 10. Alternatively, as suggested by dashed line 34 in FIG. 5, the inlet port 32 may be divided into separate ports, 32a and 32b respectively, to feed different types of melt to the front and rear faces 20 and 22 respectively.

Figure 6:
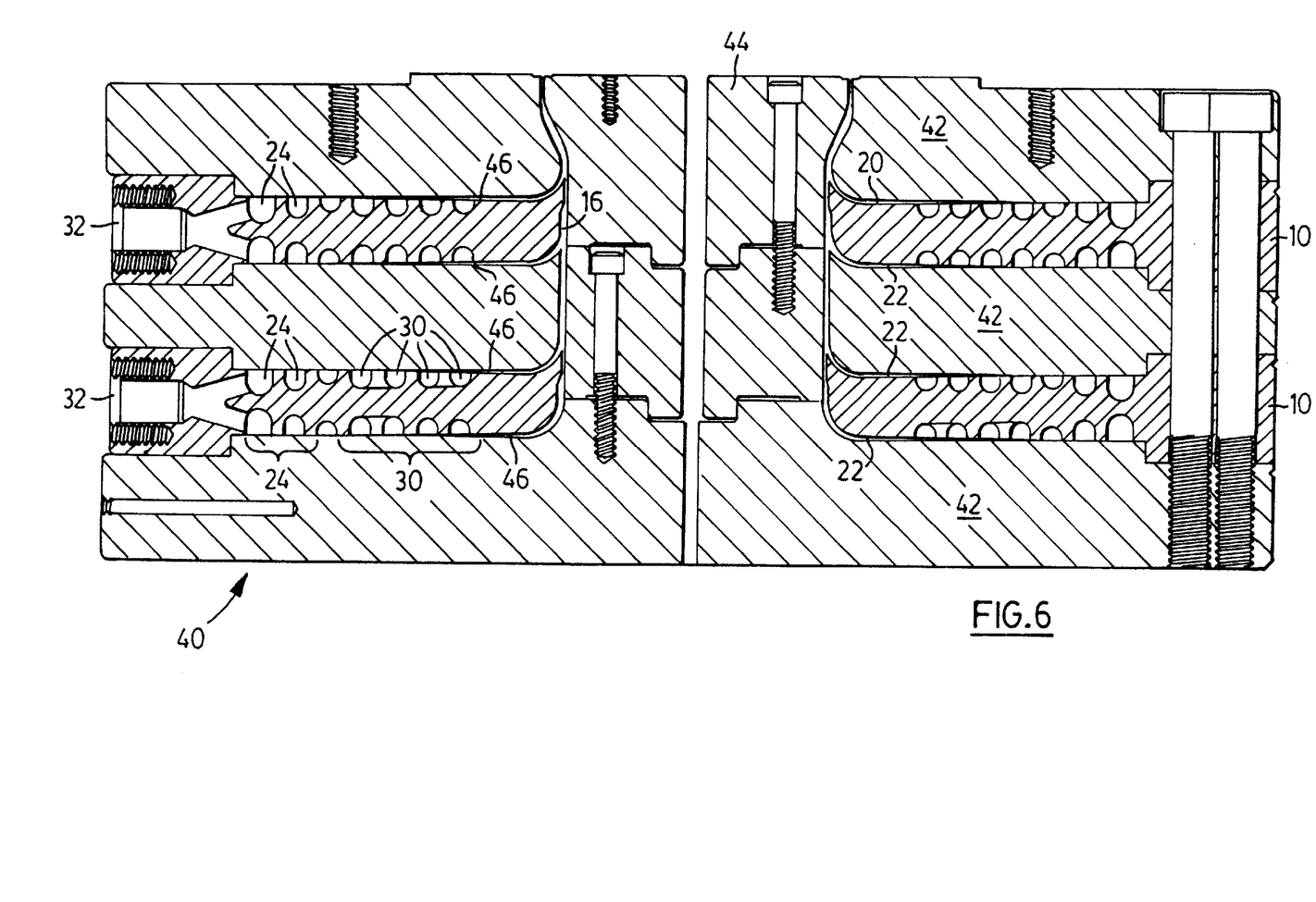
FIG. 6 is an axial section through a melt distribution die according to the present invention.

A melt distribution die according to another aspect of the present invention is generally indicated by reference 40 in FIG. 6. A segment of a melt distribution die 40 is shown in larger scale in FIG. 7. The melt distribution die 40 includes an axially stacked array of melt distribution blocks 10 as described above interspersed with separator blocks 42, extending about a central mandrel 44. The extrusion passage 16 is defined between the separator blocks 42, melt distribution blocks 10 and the central mandrel 44.

Figure 7:
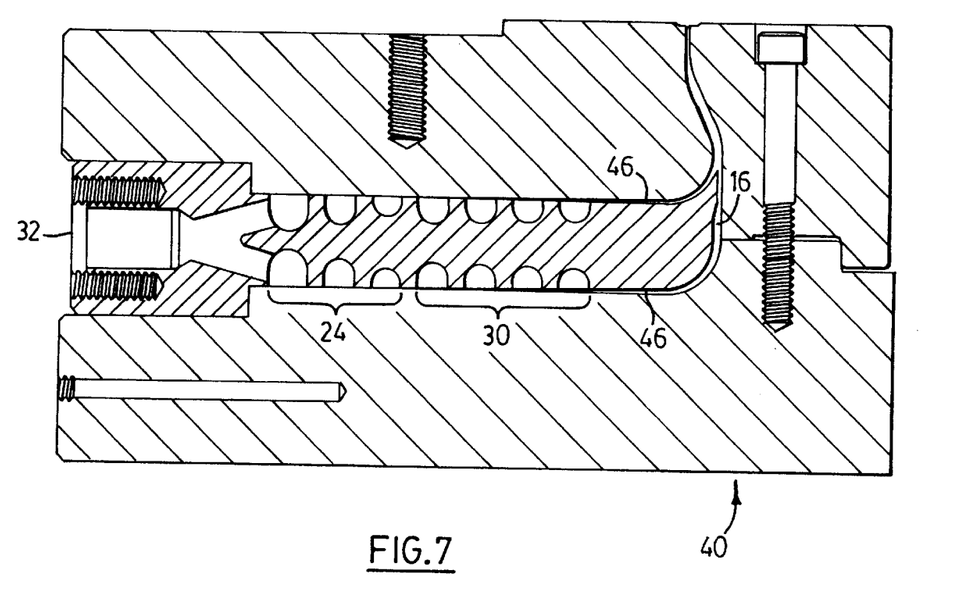
FIG. 7 is an axial sectional view illustrating one half of a melt distribution block according to the present invention mounted between two separator blocks; and, FIG. 8 is an axial section through a melt distribution die according to an alternate embodiment of the present invention.

The flow divider channels 24 are completely covered by the separator blocks 42 in FIGS. 6 and 7. The feed spirals 30 are not completely covered by virtue of a space between the separator blocks 42 and the front and rear faces 20 and 22 respectively adjacent the feed spirals 30 to define a melt outlet passage 46 extending into the extrusion passage 16. Melt will therefore overflow the edges of the feed spirals 30 to form a film of melt which is continuous about the circumference of the melt distribution block 10 at least leading into the extrusion passage 16.

In the arrangement illustrated, the front face 20 tapers toward the rear face 22 adjacent the feed spirals 30 to provide the space for the melt outlet passage 46. Alternatively, the front face 20 and rear face 22 may be substantially parallel across the melt block 10 and the space for the melt outlet passage 46 may be accommodated by relieving the corresponding faces of the separator blocks 42.

Although two melt distribution blocks 10 are illustrated in the stacked array of the melt distribution die 40, it will be appreciated by those skilled in such structures that more or less melt distribution blocks may be accommodated depending on the number of layers required to be co-extruded.

Creating multi-layer films requires processing different materials and different layers. This means that dissimilar materials are processed at different temperatures. While not always the case, some materials can be damaged or degraded if they are exposed to temperatures above their respective optimal processing temperatures. When a temperature degradeable material in a co-extrusion die is placed adjacent a material that is processed at a higher temperature, as is often the case, the hotter processing material will transfer thermal energy to the heat sensitive material. This will tend to raise the temperature of the heat sensitive material and potentially cause its degradation.

Figure 8:
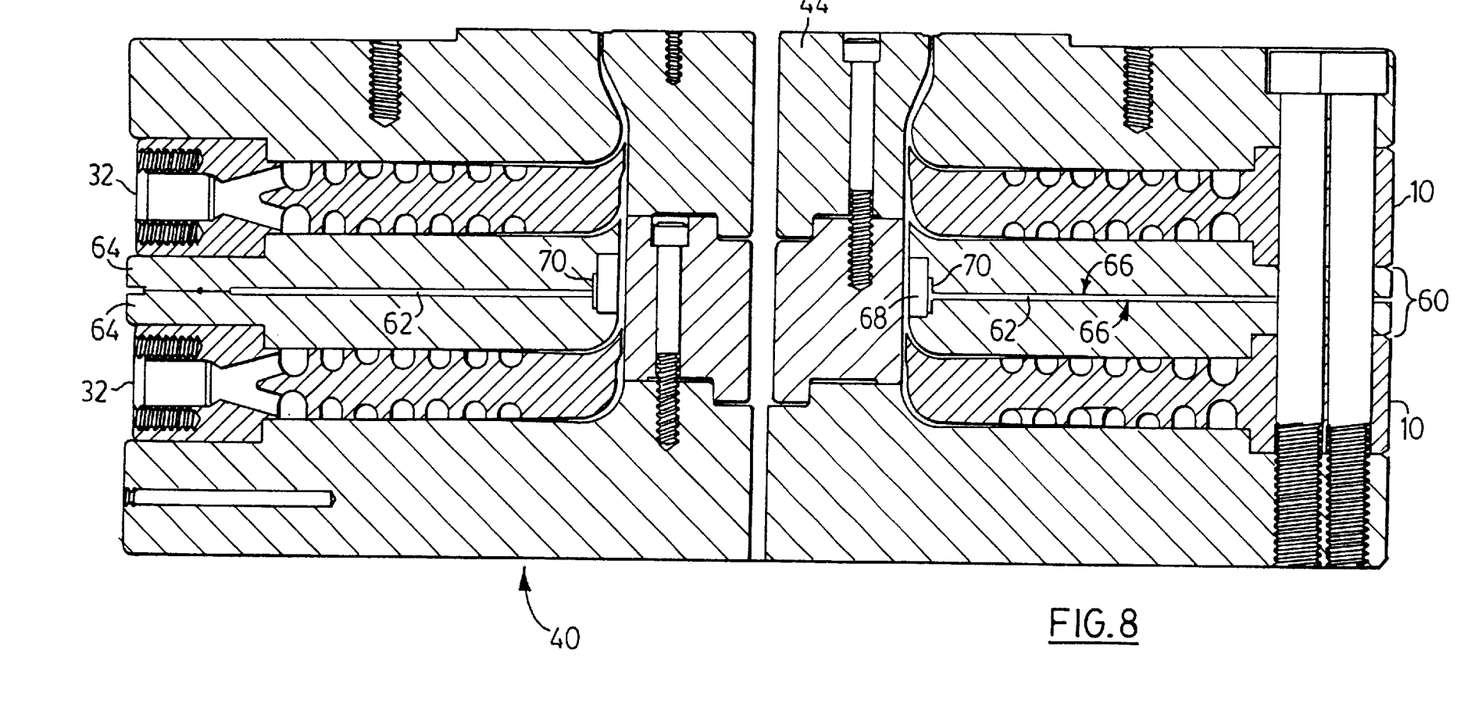

According to a preferred embodiment of the present invention, the temperature transfer problem may be addressed by adding an insulation layer between adjacent melt distribution blocks 10 to inhibit thermal energy transferred between layers. FIG. 8 illustrates one manner in which adjacent melt distribution blocks 10 may be thermally isolated. In the FIG. 8 embodiment, one of the separator blocks, indicated by reference 60, includes an insulating zone 62. According to this embodiment, the insulating zone 62 may be a gap between adjacent faces 66 of adjacent parts 64 of the separator block 60. The gap 62 may be formed by machining at least one of the adjacent faces 66 of the parts 64 of the separator so as to form a recess extending into the face(s). In FIG. 8, corresponding recesses extend into each adjacent face. It will be appreciated however that only one of the faces 66 need be provided with a recess to form the gap comprising the insulating zone 62.

In the FIG. 8 embodiment, a spacer 68 is provided between the parts 64 of the spacer block 60 adjacent the mandrill 44 to provide support and maintain the parts 64 in a spaced apart relationship. The gap which comprises the insulating zone 62 may extend between the parts 64 and a radially outward face 70 of the spacer 68. The spacer 68 may be of a metal, but preferably one with a lower thermal conductivity than that of the separator block 60.

Other approaches to thermal isolation may be used as alternative or in addition to the use of a gap for the insulation zone 62. For example, a ceramic insulator may be used between the parts 64 either within or in lieu of the gap.

The above description is intended in an illustrative rather than a restrictive sense. Variations to the exact structures described may be apparent to those skilled in coextrusion dies without departing from the spirit and scope of the present invention as defined by the claims set out below.

We claim:

1. A melt distribution block for feeding melt radially inwardly through an extrusion die to an extrusion passage, said melt distribution block comprising:
   a generally annular body having an inner face for extending about said extrusion passage, an outer face radially outward of said inner face and opposite front and rear faces;
   said front and rear faces having a series of flow divider channels therein extending in a generally radially inward direction substantially parallel to said front and rear faces from an inlet through a series of flow dividing bifurations to terminate in a plurality of feed spirals;
   each said feed spiral substantially encircling said inner face and narrowing toward a radially inwardly disposed end;
   said feed spirals on said front and rear faces curving in respectively opposite directions; and,
   an inlet port extending into said outer face and fluidly communicating with said inlet of said flow divider channels.

2. A melt distribution block as claimed in claim 1 wherein:
   said series of flow divider channels are generally concentrically disposed;
   an outermost of said flow divider channels fluidly communicates with said inlet port; and,
   a remainder of said flow divider channels fluidly communicate about midway therealong with a respective end of a flow divider channel radially outwardly disposed therefrom each said flow divider channel providing two oppositely directed melt flow paths of similar configuration and flow rate.

3. A melt distribution block as claimed in claim 2 wherein:
   said front and rear faces are substantially parallel adjacent said flow divider channels and taper in profile toward said inner face adjacent said feed spirals.

4. A melt distribution block as claimed in claim 2 wherein:
   said inlet port is divided to provide a separate melt flow path to each said inlet of said flow divider channels on said front and rear faces.

5. A melt distribution block as claimed in claim 3 wherein:
   said inlet port is divided to provide a separate melt flow path to each said inlet of said flow divider channels on said front and rear faces.

6. A melt distribution block as claimed in claim 2 wherein:
   each said feed spiral fluidly communicates with two of said flow divider channels.

7. A melt distribution block as claimed in claim 3 wherein:
   each said feed spiral fluidly communicates with two of said flow divider channels.

8. A melt distribution block as claimed in claim 4 wherein:
   each said feed spiral fluidly communicates with two of said flow divider channels.

9. A melt distribution block as claimed in claim 5 wherein:
   each said feed spiral fluidly communicates with two of said flow divider channels.

10. A melt distribution die comprising:
    an axially stacked array of melt distribution blocks interspersed with separator blocks extending radially about a centrally disposed mandrel and defining an extrusion passage therebetween;
    each said melt distribution block having an inner face extending about and spaced apart from said mandrel, a radially outwardly facing outer face, and opposite front and rear faces;
    said front and rear faces having a series of flow divider channels thereon which run in a generally radially inwardly extending direction substantially parallel to said front and rear faces from an inlet through a series of flow dividing bifurcations to terminate in a plurality of feed spirals, each said feed spiral substantially encircling said inner face and narrowing toward a radially inwardly disposed end;
    said feed spirals on said front and rear faces curving in respectively opposite directions relative to said mandrel;
    respective inlet ports extending into said outer face of each said melt distribution block for providing melt to said inlets of said channels;
    said separator blocks covering respective of said flow divider channels to maintain melt flow in said flow divider channels; and,
    said separator blocks being spaced apart from respective of said feed spirals to define a radially and circumferentially continuous melt outlet passage extending into said extrusion passage.

11. A melt distribution die as claimed in claim 10 wherein:
    said series of flow divider channels of each said melt distribution block are generally concentrically disposed with an outermost of said flow divider channels receiving melt flow from said inlet port, and a remainder of said flow divider channels receiving melt flow about midway along respective lengths thereof from a respective end of respective said flow divider channels radially outwardly disposed therefrom.

12. A melt distribution die as claimed in claim 11 wherein:
    said inlet port of at least one of said melt distribution blocks is divided to provide a melt flow path for melt of respectively different compositions to said inlet of said flow divider channels on said front and rear faces.

13. A melt distribution die as claimed in claim 11 wherein:
    said front and rear faces of said distribution blocks are substantially parallel adjacent said flow divider channels and incline toward each other adjacent said feed spirals; and,
    said separator blocks have substantially parallel upper and lower faces.

14. A melt distribution die as claimed in claim 11 wherein:
    each said feed spiral receives melt from two of said flow divider channels.

15. A melt distribution die as claimed in claim 12 wherein:
    each said feed spiral receives melt from two of said flow divider channels.

16. A melt distribution die as claimed in claim 13 wherein:
    each said feed spiral receives melt from two of said flow divider channels.

* * * * *